United States Patent [19]

Mitsuhashi et al.

[11] Patent Number: 5,382,880
[45] Date of Patent: Jan. 17, 1995

[54] METHOD FOR EMITTING LIGHT WHICH DOES NOT SUBSTANTIALLY DELAY THE LATENCY OF P100 WAVE IN HUMAN VEP

[75] Inventors: Masakazu Mitsuhashi; Osamu Matsuda, both of Okayama, Japan

[73] Assignee: Ken Hayashibara, Okayama, Japan

[21] Appl. No.: 139,061

[22] Filed: Oct. 21, 1993

Related U.S. Application Data

[63] Continuation of Ser. No. 848,436, Mar. 9, 1992, abandoned.

[30] Foreign Application Priority Data

Mar. 8, 1991 [JP] Japan ................................. 3-067539

[51] Int. Cl.$^6$ ................................................. G05F 1/00
[52] U.S. Cl. ................................. 315/291; 315/200 R; 315/205; 313/643
[58] Field of Search ............ 313/643; 315/291, 200 R, 315/205, DIG. 7; 363/132; 128/731

[56] References Cited

U.S. PATENT DOCUMENTS

| | | | |
|---|---|---|---|
| 2,115,480 | 4/1938 | Claude | 313/643 |
| 4,752,719 | 6/1988 | McEwan | 315/200 R |
| 5,126,636 | 6/1992 | Masaki | 315/291 |

OTHER PUBLICATIONS

*Visual Evoked Potential,* published by Nishimura Co. Ltd., Ni-igata, Japan (1989). By G. G. Celesia. pp. 2-5, 93-97.

Memoirs of the Kure Technical College, vol. 17, No. 1, pp. 75-78 (1981). "Studies of Visual Fatigue under the Flourescent Lamps Lighting" by Kazuhiro Harada.

*Primary Examiner*—Robert J. Pascal
*Assistant Examiner*—Haissa Philogene
*Attorney, Agent, or Firm*—Browdy and Neimark

[57] ABSTRACT

Disclosed is a lighting device to emit a light which substantially does not delay the latency of P100 wave in human VEP. Such a light hardly causes eyestrain when used in illumination. This renders the lighting device very useful in various illuminations directed to retaining healthy eyes.

10 Claims, 3 Drawing Sheets

FIG.5

```
┌─────────────────────────────────────────────┐
│ POWER SOURCE OF SWITCHING REGULATOR TYPE,   │
│    CONTAINING RECTIFIER CIRCUIT BEARING     │
│              SMOOTHING MEANS                │
└─────────────────────────────────────────────┘
                      │
                      ▼
              ┌──────────────────┐
              │ INCANDESCENT LAMP│
              │        OR        │
              │ FLUORESCENT LAMP │
              │        OR        │
              │ ARC DISCHARGE LAMP│
              └──────────────────┘
```

METHOD FOR EMITTING LIGHT WHICH DOES NOT SUBSTANTIALLY DELAY THE LATENCY OF P100 WAVE IN HUMAN VEP

This application is a continuation of application Ser. No. 07/848,436, filed Mar. 9, 1992, now abandoned.

BACKGROUND OF THE INVENTION

1. Field of the Invention

This invention relates to a lighting device, in particular a lighting device to emit a light which hardly causes eyestrain.

2. Description of the Prior Art

Eyestrain is a fatigue phenomenon caused by visual tasks. It is said that environmental factors are major causes of eyestrain and greatly dependent on the quality of illumination for visual tasks and the size, movement and contrast of visual objects. In addition to usual muscular fatigue produced in the head, neck and shoulders, eyestrain sometimes causes fatigue in autonomic nerves which may result in abnormality in the control of pupil and ciliary body. It is also said that eyestrain is a primary cause to ophthalmological diseases such as asthenopia, myopia and pseudomyopia, and recent objectives of achieving healthy and pleasant life is accompanied by great demand for the development of lighting devices which hardly cause eyestrain.

As to reports on the relationship between eyestrain and illumination, for example, K. Harada, *Memoirs of the Kure Technical College*, Vol.17, No.1, pp.75-78 (1981) is available. In this report, the relationship between eyestrain and color rendering properties is discussed, coming to the conclusion that lights with better color rendering properties causes less eyestrain. Our study resulted in the finding that luminous sources even with a general color rendering index (Ra) of 100, for example, incandescent lamps and good color rendering fluorescent lamps, often cause eye fatigue when used in visual tasks.

As described above, since no parameter to quantify eyestrain has been found, it has been very difficult to clearly judge whether or not a particular light tends to cause eyestrain when used in illumination.

DETAILED DESCRIPTION OF THE INVENTION

This invention is to provide a lighting device which hardly causes eyestrain and, in order to develop such a lighting device, we studied at first parameters to quantify eyestrain.

We studied the relationship between eyestrain and illumination particularly utilizing the visual evoked potential (abbreviated hereinafter as "VEP") which has been known as clinical test for troubles and diseases in ophthalmology, and discovered the phenomenon that when a visual task causes eyestrain, the latency of P100 wave significantly delays. At the same time, we found that the delay advances as the eyestrain proceeds; we also found that any eyestrain due to illumination can be quantified by determining the degree of such a delay.

As described in Y. Kuroiwa and G. G. Celesia, "Visual Evoked Potential", published by Nishimura Co., Ltd., Ni-igata, Japan (1989), VEP is a kind of cerebral evoked potential which appears within 250 milliseconds after a flash stimulation at one hertz or lower and usually consists of 5 to 10 waves. Among these waves, the negative potential appearing about 75 milliseconds after the stimulation is called as "N75 wave", while the positive potential appearing 100 milliseconds after the stimulation is called as "P100 wave".

Based on these findings, we screened various luminous sources and found that lights which substantially do not delay the latency of the P100 wave in human VEP hardly cause eyestrain and are favorably feasible in lighting devices directed to healthy eye.

In particular, this invention relates to a lighting device to emit a light which substantially does not delay the latency of P100 wave in human VEP, and a method for achieving same.

The wording "substantially does not delay the latency of P100 wave in human VEP" means that when visual task is loaded under a light illumination, the latency of the P100 wave substantially does not change before and after loading the visual task. Speaking more concretely, for example, when determined by the below described electroencephalographic procedure, the delay due to about 120-minute visual task is not more than about 5%, desirably, not more than about 3%, provided that the latency immediately before loading the visual task is regarded as 100.

Now explaining more concretely the constitutive elements of this invention, the lighting device of this invention comprises a luminous source capable of emitting a light which substantially does not delay the latency of the P100 wave in human VEP, and a power source to energize the luminous source.

Examples of such a luminous source include incandescent lamps, fluorescent lamps with or without electrode and arc discharge lamps, and any such a luminous source is feasible in this invention as long as it emits a light which substantially does not delay the latency of the P100 wave in human VEP. Particular luminous sources are incandescent lamps such as xenon gas-enclosed incandescent lamp, good color rendering fluorescent lamps such as multiband radiation type fluorescent lamps, and arc discharge lamps such as xenon discharge lamp.

Among these luminous sources, xenon gas-enclosed incandescent lamps, wherein a composition essentially consisting of xenon and nitrogen gases is contained in a glass bulb with a tungsten filament, is most suitable in this invention because such an incandescent lamp is good in luminous characteristics, long in life expectancy, and easy to handle and manufacturable at low cost. Such a composition usually contains xenon gas in an amount exceeding about 15% by volume but not exceeding about 80% by volume, desirably in the range of about 20–75% by volume. To allow xenon gas to sufficiently exhibit its desirable luminous characteristics and extended life expectancy, it is desirable to maximize the amount of xenon gas while keeping arc starting voltage to an adequately high level. Such a composition is enclosed usually in an amount which brings the internal pressure of glass bulb to about 700–800 torr when in incandescent state.

To allow such a xenon gas-enclosed incandescent lamp to emit the objective light, the lamp is energized with a power source which is capable of supplying a voltage exceeding the rating of the lamp, desirably a dc voltage in the range of about 105–140% thereof. For example, a xenon gas-enclosed lamp, rated voltage of 100 or 110 V, rated wattage of 40–100 W, is operated at a dc voltage of about 105–140% of its rating which is obtainable by rectifying and smoothing standard ac line with a rectifier circuit bearing smoothing means such as capacitor. Power sources, for example of switching regulator-type such as chopper type, flyback converter type, forward converter type, push-pull converter type, half-bridge converter type and full-bridge converter type, are more suitable in cases where two or more xenon gas-enclosed lamps are operated with one power source; where lighting devices are used in an environment with a relatively large voltage variation; or where a lighting device with a relatively large capacity is placed in a limited space.

BRIEF DESCRIPTION OF THE FIGURES

FIG. 5 is a schematic diagram illustrating power source and lamp.

Figure 1:
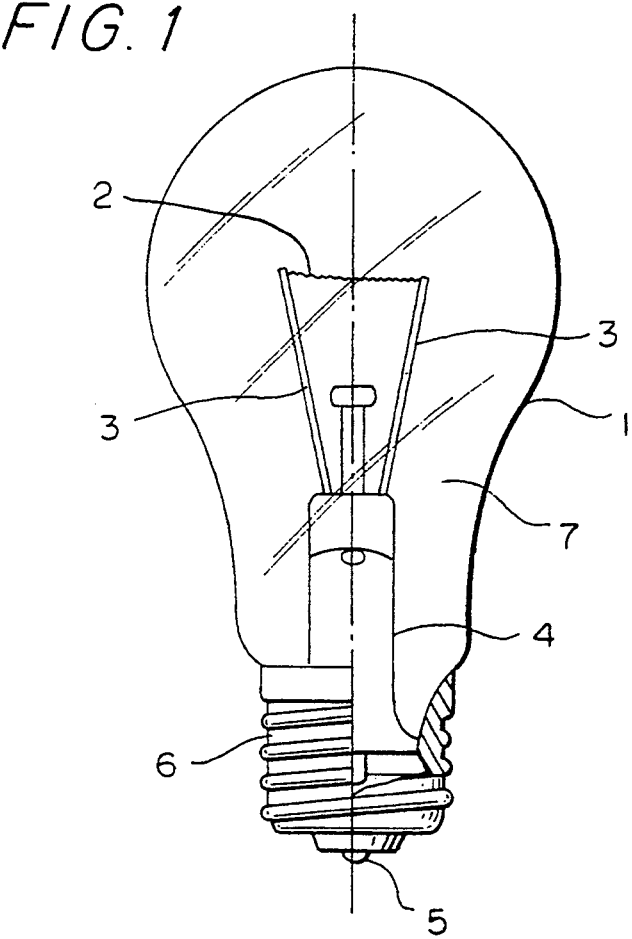
FIG. 1 is a partially cutaway view in side elevation of an incandescent lamp used in this invention.

Throughout the Figures, reference numeral 1 designates glass bulb; 2, filament; 3, lead wire; 4, stem bulb; 5, eyelet; 6, base; 7, filling composition for incandescent lamp; and 8, anchor wire.

DESCRIPTION OF THE PREFERRED EMBODIMENTS

Several embodiments of this invention will be explained below in conjunction with the Figures.

FIG. 1 shows a xenon gas-enclosed incandescent lamp for usual illumination, rated voltage of 100 V, rated wattage of 60 W. Reference numeral 1 designates a glass bulb with frosted inside surface, maximum diameter of 55 millimeters, maximum length of 105 millimeters, which is made of a soft glass such as soda-lime glass and lead glass. In the glass bulb 1, a double-coiled tungsten filament 2 is mounted and its ends are connected with lead wires 3, 3. The lead wires 3, 3 are hermetically sealed in a stem bulb 4, and their lead-out portions are connected with an eyelet 5 or a base 6 of brass or aluminum alloy.

In the glass bulb 1, a filling composition 7 for incandescent lamp, consisting of about 75% by volume of xenon gas and about 25% by volume of nitrogen gas, is filled to give about 600 torr at ambient temperature and about 760 torr in incandescent state. The enclosing pressure is usually set to about 700–800 torr in incandescent state wherein xenon gas exhibits its desirable luminous characteristics and extended life expectancy without causing arc discharge when operated at a relatively high voltage, usually at a dc voltage of about 105–140% of the rating. Since such an enclosing pressure is sufficiently tolerable for usual soft glasses, the use of such a composition 7 facilitates low-cost production of incandescent lamps having superior luminous characteristics and extended life expectancy. Although in this Example the inside surface of the glass bulb 1 is frosted, providing a silica coating is more preferable because a silica coating more easily provides the prescribed luminous characteristics.

Figure 2:
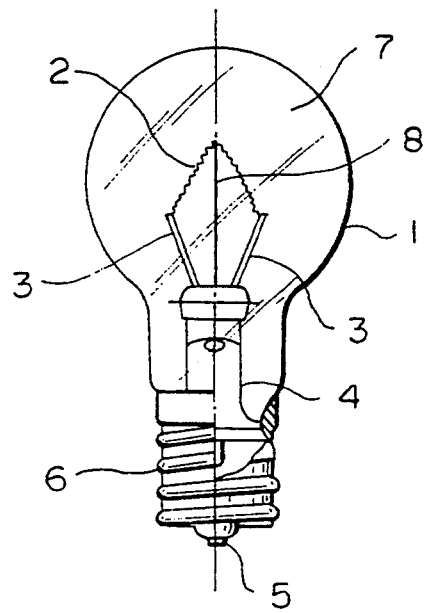
FIG. 2 is a partially cutaway view in side elevation of another incandescent lamp used in this invention.

FIG. 2 shows a small-sized xenon gas-enclosed incandescent lamp for usual illumination, rated voltage of 100 V, rated wattage of 60 W, wherein the glass bulb 1 in FIG. 1 is replaced with a glass bulb for a miniature krypton lamp. Reference numeral 1 designates the glass bulb, maximum diameter of 35 millimeters, maximum length of 67 millimeters, which is made by frosting a soft glass, for example soda-lime glass or lead glass. Similarly as in FIG. 1, there is in the glass bulb 1 a tungsten filament 2 and its ends are connected with lead wires 3, 3. The filament 2 is double-coiled and supported approximately at the center by an anchor wire 8. The lead wires 3, 3 are hermetically sealed in a stem bulb and their lead-out portions are connected with an eyelet 5 or a base 6 of brass or aluminum alloy. The glass bulb 1 encloses a filling composition 7 for incandescent lamp, consisting of about 20% by volume of xenon gas and about 80% by volume of nitrogen gas, to give about 600 torr at ambient temperature and about 760 torr in incandescent state.

Similarly as the incandescent lamp shown in FIG. 1, this embodiment is suitable as the luminous source for the lighting device of this invention. This embodiment is also suitable as luminous source directed to use in a limited space because this embodiment uses a glass bulb 1 of relatively small size.

Since the xenon gas-enclosed incandescent lamps as shown in FIGS. 1 and 2 emit a light which substantially does not delay the latency of P100 wave in human VEP when operated at a voltage exceeding their rating, usually at a dc voltage of about 105–140% of their rating, they can be favorably used in various illuminations directed to retaining healthy eyes in combination with appropriate power sources which are capable of supplying such a voltage. This will be explained with the following Experiment.

EXPERIMENT

Forty male volunteers (24–45 year old) were divided into four groups, 10 volunteers each. Each volunteer was fitted on his head with biological electrodes in accordance with "Guidelines for Clinical Evoked Potential Studies, the American Electroencephalographic Society 1984" which is described in *Clinical Electroencephalography*, Vol.30, No.10, pp.703–707 (1988), and loaded with a visual task wherein each volunteer was asked to read book for 120 minutes. Immediately before loading the visual task and 30, 60, 90 and 120 minutes thereafter, each volunteer was asked to relax in an armchair for brain wave test, administered with 200-time flash visual stimulants at one hertz using "Model 1A97A", a multipurpose electroencephalograph commercialized by NEC San-ei Instruments, Ltd., Tokyo, Japan and at the same time their VEP's were recorded in "Model XR-710", a data recorder commercialized by TEAC Corp., Tokyo, Japan. After the measurement, the recorded signals were subjected to 100-time addition processing using "Model 7T18A", a signal processor commercialized by NEC San-ei Instruments, Ltd., Tokyo, Japan, to determine the latencies for P100 and N75 waves at each measuring time, as well as to determine the difference in potential between the P100 and N75 waves.

The obtained latencies for P100 wave were put into the following equation to obtain the delay rate for the latency of P100 wave.

Delay rate (%) for the latency of P100 wave $$= \frac{A - B}{B} \times 100$$

where "A" designates the latency immediately after loading visual task, while "B" designates the latency immediately before loading visual task.

A laboratory technician mainly carried out the experiment and, after the experiment, orally asked all the volunteers about the degree of eyestrain. The results were graded into four ranks, i.e. "very tired", "tired", "not changed" and "relaxed", and the eyestrain occurring rate (%) was evaluated for each test group by calculating the percentage of "very tired" plus "tired" for all the volunteers (10 volunteers) who had participated in each test group.

The visual task was loaded under illumination using xenon gas-enclosed incandescent lamps as shown in FIG. 1 or 2, and the incandescent lamps was arranged to give a luminous intensity of 1,500 lux on visual object when the incandescent lamps were operated with a regulated power source at a dc voltage of about 105-140% of their rating.

Separately, a light (Control 1) obtained by operating daylight fluorescent lamps, rated voltage of 100 V, rated wattage of 15 W, at a high-frequency rated voltage, frequency of 40,000-50,000 hertz, and another light (Control 2) obtained by operating argon gas-enclosed incandescent lamps, rated voltage of 100 V, rated wattage of 100 W, with a standard ac line (ac 100 V) were tested similarly as above.

The results were as shown in the following Table and FIGS. 3 and 4. This Table also shows the color temperature and general color rendering index (Ra) for each tested light, which were determined in the usual manner.

Figure 3:
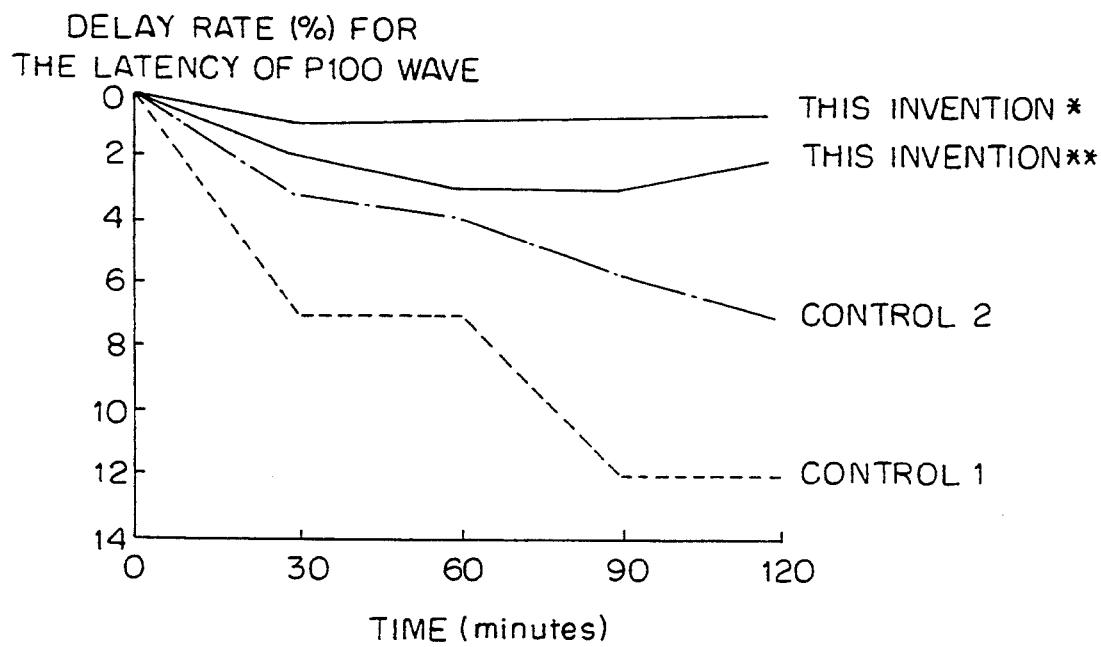
FIG. 3 is a view to explain the delay in latency of P100 wave when visual task is loaded under light illumination using several lighting devices.
Figure 4:
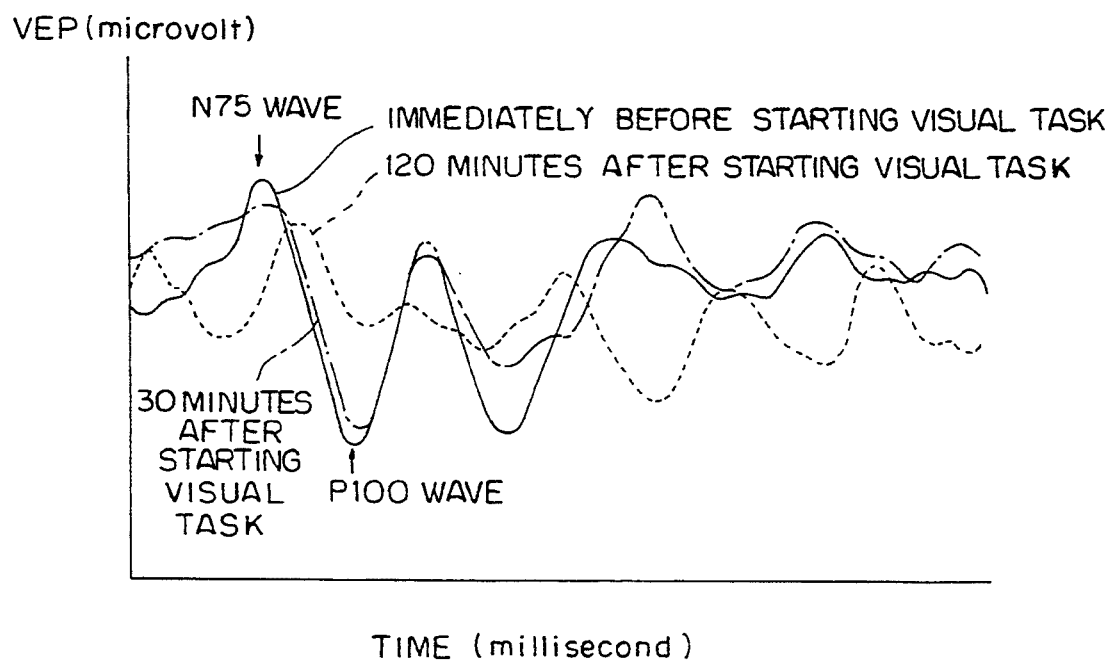
FIG. 4 is a view to illustrate the VEP waveform as observed when visual task is loaded under a light obtained by operating a fluorescent lamp at a high-frequency voltage.

As is clear from the results in FIG. 3, it was found that when visual task was loaded for 120 minutes using the lighting device of this invention wherein xenon gas-enclosed lamps as shown in FIG. 1 or 2 were mounted as luminous source, the delay in latency of P100 wave was not more than about 3%, in other words there was substantially no delay in the latency. Furthermore, the number of volunteers who complained of eyestrain due to the visual task was less, i.e. about 10-20%. These facts would suggest that the delay in latency of P100 wave proceeds as eyestrain advances, and the light emitted by the lighting device of this invention hardly causes eyestrain.

TABLE

| Efficacy | Luminous source | | | |
|---|---|---|---|---|
|  | Lamp 1 | Lamp 2 | Control 1 | Control 2 |
| Very tired | 0 | 0 | 4 | 2 |
| Tired | 1 | 2 | 4 | 5 |
| Not changed | 6 | 7 | 2 | 3 |
| Relaxed | 3 | 1 | 0 | 0 |
| Color temperature (K.) | 3,020 | 2,960 | 7,000 | 2,820 |
| General color rendering index (Ra) | 100 | 100 | 79 | 100 |
| Eyestrain occurring rate (%) | 10 | 20 | 80 | 70 |

Note: In "Lamp 1", incandescent lamps as shown in FIG. 1 were operated at dc 125 V; and in "Lamp 2", incandescent lamps as shown in FIG. 2 were operated at dc 116 V.

While in the case of Control 1 wherein fluorescent lamps were operated at a high-frequency voltage, a remarkable delay in latency of P100 wave was noted only 30 minutes after starting the visual task and, after a lapse of 120 minutes, the delay advanced up to about 12%. In the case of Control 1 wherein argon gas-enclosed incandescent lamps were operated at ac 100 V, a tendency which was similar but not so remarkable as found for Control 1 was noted and, after a lapse of 120 minutes, the delay in latency of P100 wave reached about 7%. FIG. 4 shows a time-course of VEP as observed for one volunteer in Control 1, indicating that the longer the visual task, the delay in latency of P100 and N75 waves becomes much more remarkable and the difference in potential between N75 and P100 waves becomes much less. In Controls 1 and 2, the occurrence of eyestrain due to visual task reached up to about 70-80% which was about 3- to 8-fold frequent than that found for the lighting device of this invention.

The above results would support that among lights from various lighting devices, some lights delay the latency of P100 and N75 waves in human VEP but some lights do not, and the light from the lighting device of this invention substantially does not delay the latency of these waves and hardly causes eyestrain when used in illumination. The fact that some lights with a good general color rendering index or a high color temperature which have been deemed less eyestrain causative significantly delayed the latency of P100 wave would suggest that, in addition to continuity and flicker in illuminating light, energy distribution delicately influences the occurrence of eyestrain.

Although in this experiment the volunteers were loaded with book reading as visual task, loading of other visual tasks, for example, VDT tasks and brief numerical calculations, led to similar tendencies. In the case of using xenon gas-enclosed incandescent lamp as luminous source, the latency of P100 wave substantially delayed when the operating voltage was an ac or when the operating was a dc not exceeding the rating or exceeding about 140% thereof.

As described above, the lighting device of this invention emits a light which substantially does not delay the latency of P100 wave in human VEP, and hardly causes eyestrain when used in illumination in general.

Because of this, the lighting device of this invention is useful in various uses directed to retaining healthy eyes, as well as exhibiting a remarkable efficacy in the treatment and prevention of ophthalmological diseases such as eyestrain, asthenopia, myopia and pseudomyopia.

We claim:

1. A lighting device for healthy eyes comprising:
a luminous source means for emitting a light which substantially does not delay the latency of P100 wave in human VEP when energized at a dc voltage of about 105-140% of its rated voltage, said luminous source means comprising at least one incandescent lamp which has a rated wattage of 40-100 W and emits a light which has a general color rendering index (Ra) of 100; and
a power source means for energizing said incandescent lamp with a dc voltage of about 105-140% of the rated voltage of said incandescent lamp, said dc voltage being obtainable by rectifying and smoothing a standard ac line with a rectifier circuit bearing a smoothing means.

2. The device of claim 1, wherein said incandescent lamp is a xenon gas-enclosed lamp.

3. The device of claim 2 wherein said xenon gas-enclosed lamp encloses a filling composition which contains xenon gas in an amount more than about 15% by volume but less than 80% by volume.

4. The device of claim 1, wherein said power source is of switching regulator type.

5. A method for emitting a light which has a general color rendering index (Ra) of 100 and does not substantially delay the latency of P100 wave in human VEP, which comprises
a step of energizing by a power source an incandescent lamp which has a rated wattage of 40-100 W and emits said light at a dc voltage in the range of 105-140% of the rated voltage of said incandescent lamp.

6. The method of claim 5, wherein said incandescent lamp is a xenon gas-enclosed lamp.

7. The method of claim 6, wherein said xenon gas-enclosed lamp encloses a filling composition which contains xenon gas in an amount more than 15% by volume but less than 80% by volume.

8. A method for providing light to a healthy human, which light does not substantially delay the latency of P100 wave in human VEP and hardly causes eyestrain, comprising:
  (a) energizing by a power source a luminous source to emit a light at a dc voltage in the range of about 105-140% of the rating, said luminous source being a member selected from the group consisting of an incandescent lamp, fluorescent lamp and discharge lamp; and
  (b) subjecting the human to a visual task under said light.

9. The method of claim 8, wherein said luminous source is a xenon gas-enclosed lamp.

10. The method of claim 9, wherein said xenon gas-enclosed lamp encloses a filling composition which contains xenon gas in an amount more than 15% by volume but less than 80% by volume.

* * * * *